(12) United States Patent
Autissier et al.

(10) Patent No.: US 11,279,596 B2
(45) Date of Patent: Mar. 22, 2022

(54) LOAD-BEARING DEVICE FOR A LIFTING APPARATUS

(71) Applicant: LACE, Saint-Maur (FR)

(72) Inventors: Christophe Autissier, Briantes (FR); Guillaume Meyniel, Châteauroux (FR); Yoann Schmidt, Guerande (FR)

(73) Assignee: LACE, Saint-Maur (FR)

( * ) Notice: Subject to any disclaimer, the term of this patent is extended or adjusted under 35 U.S.C. 154(b) by 0 days.

(21) Appl. No.: 16/966,895

(22) PCT Filed: Feb. 13, 2019

(86) PCT No.: PCT/EP2019/053494
§ 371 (c)(1),
(2) Date: Aug. 2, 2020

(87) PCT Pub. No.: WO2019/158555
PCT Pub. Date: Aug. 22, 2019

(65) Prior Publication Data
US 2021/0047148 A1 Feb. 18, 2021

(30) Foreign Application Priority Data
Feb. 14, 2018 (FR) ...................................... 1851213

(51) Int. Cl.
*B66C 1/36* (2006.01)
*F16H 25/18* (2006.01)
(52) U.S. Cl.
CPC .............. *B66C 1/36* (2013.01); *F16H 25/18* (2013.01)
(58) Field of Classification Search
CPC .............. B66C 1/34; B66C 1/36; F16H 25/18

USPC ............................ 294/82.3, 82.31, 82.33, 75
See application file for complete search history.

(56) References Cited

U.S. PATENT DOCUMENTS

| 3,578,373 A | * | 5/1971 | Metz | ......................... B66C 1/34 |
| | | | | 294/82.3 |
| 3,845,978 A | | 11/1974 | Huber | |
| 3,926,467 A | * | 12/1975 | Crissy | ....................... B66C 1/34 |
| | | | | 294/82.33 |

(Continued)

FOREIGN PATENT DOCUMENTS

| FR | 2137404 | 12/1972 |
| GB | 890178 | 2/1962 |
| GB | 2513646 | 11/2014 |

OTHER PUBLICATIONS

Cabral Matos, A., International Search Report, dated May 13, 2019, 2 pages, European Patent Office, Rijswijk, Netherlands.

*Primary Examiner* — Dean J Kramer
(74) *Attorney, Agent, or Firm* — Henricks Slavin LLP

(57) ABSTRACT

A bearing device comprising a hook, housing, and latch and release mechanism for locking and unlocking the hook, the lock and release mechanism having a pivot latch with a lower cavity capable of receiving one end of the hook, a lever and a locking cam. The lever is pivotally mounted in the housing and has first roller and second rollers on the ends thereof, the latch has an upper cavity in which the first roller can rest and roll, the cam has at least one locking arm on which the second roller can rest and roll. A rotation of the cam in one direction causes the lever to tilt in the other direction, releasing the first roller from the latch, and causes the latch to pivot under the weight of the hook until the end of the hook is released from the lower cavity in the latch.

10 Claims, 7 Drawing Sheets

(56) References Cited

U.S. PATENT DOCUMENTS

| | | | |
|---|---|---|---|
| 4,678,219 A | 7/1987 | Smith et al. | |
| 2005/0258658 A1* | 11/2005 | Tollenaere | B66C 1/34 |
| | | | 294/82.31 |

* cited by examiner

LOAD-BEARING DEVICE FOR A LIFTING APPARATUS

CROSS REFERENCE TO RELATED APPLICATIONS

This application is a National Stage of International Application No. PCT/EP2019/053494, filed Feb. 13, 2019, which claims priority from FR 1851213 filed Feb. 14, 2018, the entire contents of which are incorporated herein by reference.

TECHNICAL FIELD

The present invention belongs to the field of load-bearing devices for lifting, and more particularly relates to a cargo hook.

More particularly, the invention relates to a load hook for helicopter type aircraft.

STATE OF THE ART

In the context of lifting and transporting loads, it is known to use hooking devices which enable, via slings or other lifting accessories, the suspension of loads to lifting apparatuses such as static or mobile cranes, helicopters and the like. Such devices are commonly referred to as cargo hooks or load-carrying hooks.

The transportation of external loads suspended from a helicopter requires specific attachment devices that must have a compromise between weight, strength, bulk and safety, in accordance with the requirements of air transport.

The cargo hooks generally include a hook that is pivotable between a closed position, the load bearing position, and an open position in which the load can be released from the hook. The cargo hooks are further provided with a pawl which enables locking of the hook in the closed position during the flight. To be able to quickly release the load, one or more electrical unlocking mechanisms may be provided which can be actuated from the helicopter by the crew to release the pawl and allow the hook to adopt the open position. For security, redundancy of the locking mechanisms is preferable and one or more manual release mechanisms may also be contemplated, said mechanisms being able to take the form of a control lever on the cargo hook itself and/or in the form of a manual unlocking system or a hydraulic system which can also be used inside the helicopter.

There are circumstances where the air safety issues require that the load carried by a helicopter and attached to the outside thereof can be immediately released. For example, the loss or a defective decrease in the speed of an engine during the transport of external goods constitutes emergency situations which require the immediate release of such a cargo. On the other hand, the externally attached cargo is generally suspended at a distance below the helicopter, so that the helicopter and its externally connected cargo define a pendulum system, the helicopter acting as a fixed support for such a pendulum system. The oscillations induced in the externally attached cargo can result in significant stresses in the hook and cause it to be unintentionally opened.

In known fastening devices, the hook is connected to a mechanism which enables it to be held in the closed position and the opening thereof. Such mechanisms generally include locking cams that actuate one or more levers that act on a lock with which the hook opens or closes.

For example, the document GB 2513646 describes a hooking device comprising a hook whose opening and closing are ensured by a mechanism comprising a lock, provided with a first end capable of retaining an upper arm of the hook, a lever cooperating with the lock and a locking cam for actuating the lever.

In addition to their complexity, the existing solutions have major drawbacks such as, for example, a lock that rests on bearings that can easily be overcome by the weight of the lifted loads thereby causing accidental opening of the hook, or very low torque reduction ratios that do not make it possible to reduce the effort required for opening the hook.

PRESENTATION OF THE INVENTION

The main purpose of the present invention is to overcome the limitations of the prior art and relates to a bearing device for lifting and transporting loads comprising a hook, a housing in which the hook is pivotally mounted, and a latch and release mechanism placed inside the housing for locking the hook in a closed position and releasing said hook into an open position, the latch and release mechanism comprising a pivoting latch provided with a lower cavity shaped to receive an upper end of the hook, a lever cooperating with the latch and a locking cam for actuating the lever.

The invention is characterised in that the lever is pivotally mounted in the housing and comprises a first roller at a first end and a second roller at a second end opposite the first end, in that the latch comprises an upper cavity in which the first roller can rest and roll, in that the locking cam is provided with at least one locking arm on which the second roller can rest and roll, and in that rotation of the locking cam in one direction produces a tilting of the lever in the other direction, releasing the first roller from the latch, and pivoting the latch under the effect of the hook until the end of said hook is released from the lower cavity of said latch.

More particularly, the hook is pivotally mounted about a pivot axis of the hook and comprises an upper arm, ending in the upper end, and a lower arm, said arms determining a groove capable of receiving a connector of a lifting accessory.

Advantageously, a safety pawl is mounted so as to pivot about a pivot axis of the pawl between an open position allowing the engagement of the connector of the lifting accessory in the groove of the hook and a closed position closing an opening of said groove.

In one embodiment, the closed position of the pawl has an unlocked state allowing the pawl to pass to the open position by a pressure of the connector of the lifting accessory, and a locked state in which the pawl is immobilized.

Advantageously, the latch is pivotally mounted in the housing about a pivot axis of the latch, and wherein the lower cavity has a bearing surface on which the upper end of the hook rests in the closed position and the upper cavity has a rounded concave surface that conforms to a shape of the first roller.

According to one embodiment, the lever is pivotally mounted in the housing about a pivot axis of the lever and has a recess between said pivot pin of the lever and the second roller.

As a result, the rotation of the locking cam for opening the hook causes the locking arm to be inserted into the recess of the lever.

Advantageously, the tilting of the lever is achieved by the action of the locking arm on the second roller when the locking cam is rotated and by the action of the upper cavity of the latch on the first roller under the effect of the weight of the hook.

According to one embodiment, the rotation of the locking cam is actuated and controlled by at least one electric or hydraulic control.

The fundamental concepts of the invention which have just been explained above in their most elementary form, other details and characteristics will emerge more clearly upon reading the following description and with regard to the appended drawings, giving, by way of non-limiting example, an embodiment of a bearing device according to the principles of the invention.

BRIEF DESCRIPTION OF THE FIGURES

The various figures as well as the elements of the same figure are not necessarily shown on the same scale. In all of the figures, the identical elements bear the same reference mark.

It is thus illustrated by.

DETAILED DESCRIPTION OF EMBODIMENTS

In the preferred embodiment described below, reference is made to a bearing device mainly intended for the transport of loads per helicopter. This example is in no way exclusive of applications to lifting and transporting loads by other apparatuses.

Such a bearing device is usually connected to a helicopter which comprises at this end attachment means such as, for example, a clevis, bearing or bores. The bearing device then allows the suspension of the load to be transported, via a lifting accessory. It is understood by lifting accessory any component or equipment not connected to the helicopter, making it possible to grip the load, which is placed either between the bearing device of the helicopter and the load, or on the load itself; slings are for example considered as lifting accessories, slinging material, damping elements, ropes, nets, skips, platforms, vehicle lifting equipment; these lifting accessories can also be provided with secondary hooks, connectors such as rings or shackles, and torsional compensators.

Figure 1A:
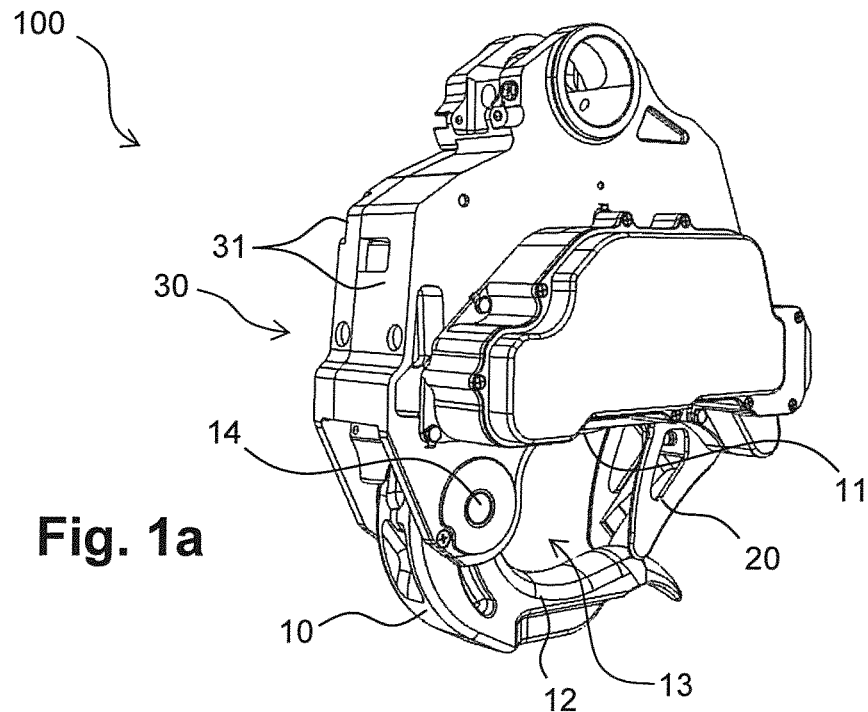
FIGS. 1a and 1b: perspective views of the load-bearing device according to the invention.
Figure 1B:
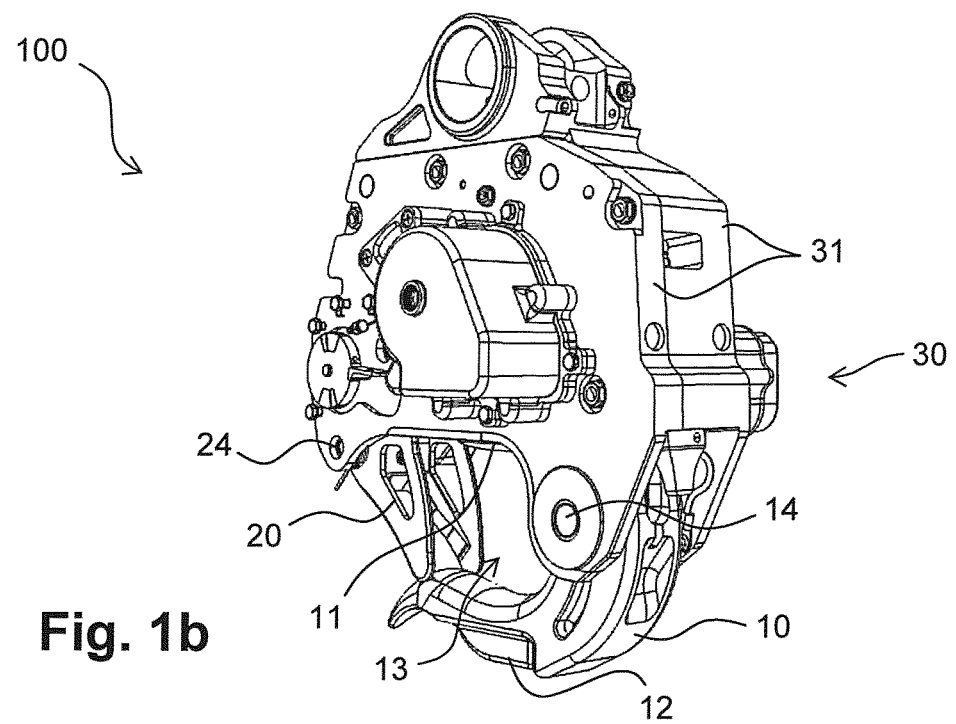

FIGS. 1a and 1b show in perspective views a bearing device 100 comprising mainly a hook 10, a safety pawl 20, a housing 30 with respect to which the hook and the safety pawl are articulated, and in which is placed a mechanism for latching and releasing of the hook which will be described later and which constitutes a fundamental part of the present invention.

According to the example illustrated, the hook 10 has a U-shaped curved shape and comprises an upper arm 11 and a lower arm 12, the load arm, said arms determining a groove 13 in which a connector of a lifting accessory (not shown) is engaged, such as a ring or a shackle.

The hook 10 is mounted so as to pivot relative to the housing 30 about a pivot axis 14 of the hook arranged at a portion joining the two arms of said hook.

Figure 3:
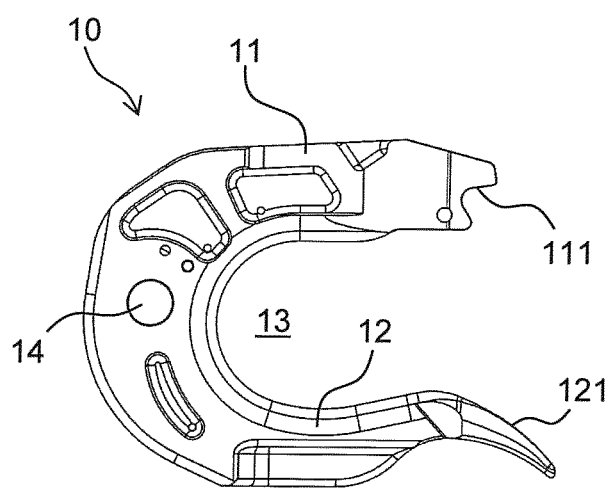
FIG. 3: a front view of the hook of the load-bearing device according to the invention.

FIG. 3 shows the hook 10 isolated from the rest of the hooking device.

According to the example illustrated, the safety pawl 20 comprises two facing planar portions, of generally triangular shape, defining a hollow volume of the pawl, in which volume can be housed a portion of the load arm 12 of the hook 10 with a minimum lateral clearance.

The safety pawl 20 is mounted so as to pivot relative to the housing 30 about a pivot axis of the pawl 24.

The pivot axes of the hook 10 and of the pawl 20 are held stationary with respect to the housing 30.

According to the example illustrated, the housing 30 comprises two flanges 31 spaced apart and connected together by fixing means such as bolts and spacers.

The hook 10 pivots about the pivot axis of the hook 14 between a closed position, a load bearing position, and an open, load-releasing position. In the closed position, the safety pawl 20 closes the open side of the groove 13 of the hook 10 between the end of the upper arm 11 and the end of the load arm 12. The open position in turn corresponds to a clearance of the open side of the groove 13. This clearance is obtained by tilting the hook 10 downwards of the hooking device, the open side of the groove 13 then being separated from the safety pawl 20 which remains substantially at the same position in both configurations, closed and open, of the hooking device.

Furthermore, the safety pawl 20 pivots about the pivot axis of the pawl 24 between an open position and a closed position which can be unlocked or locked, the pawl being constantly biased angularly by a torsion spring (not shown). The operation of the safety pawl is provided by means and components which are not described in the present application, which relates more particularly to the mechanism for unlocking the hook 10.

According to the example illustrated, the latch and release mechanism is placed between the flanges 31, inside the housing 30, and comprises a lock 41, a lever 42 and a locking cam 43.

Figure 2:
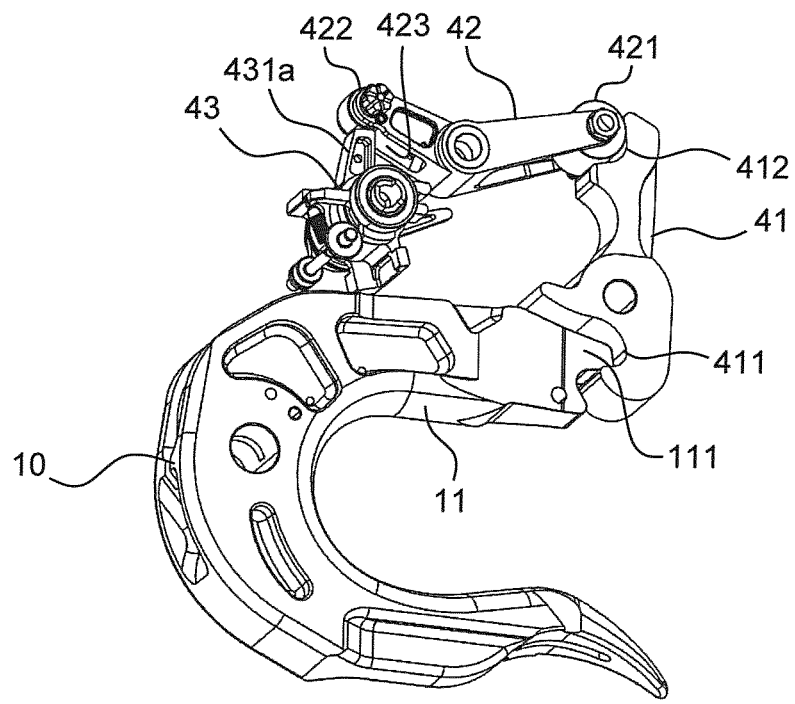
FIG. 2: a perspective view of the latch and release mechanism coupled to the hook according to the invention.

FIG. 2 shows a perspective view of the various elements of the latch and release mechanism of the hook 10, the flanges of FIGS. 1a and 1b being removed to allow the arrangement of elements of said mechanism to be made transparent.

Figure 4:
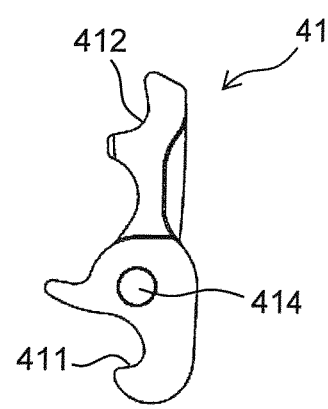
FIG. 4: a front view of the lock of the latch and release mechanism of FIG. 2.

The latch 41, shown in FIG. 4, has an elongated shape and comprises a lower cavity 411 and an upper cavity 412. The latch 41 is pivotally mounted in the housing 30 about a pivot axis 414 of the latch. The two cavities of the latch 41 are provided at both ends of said latch.

Figure 5:
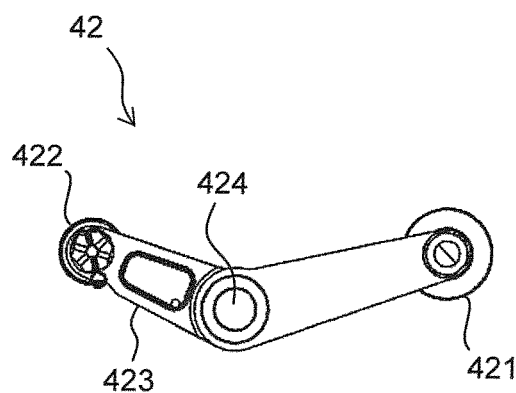
FIG. 5: a front view of the lever of the latch and release mechanism of FIG. 2.

The lever 42, shown in FIG. 5, comprises a first roller 421 at a first end and a second roller 422 at a second end opposite said first end. The lever is mounted so as to pivot in the housing about a pivot axis of the lever, each roller of the lever being able to rotate about a specific axis of the roller, its axis of revolution, for example when the latter is circular.

Figure 6:
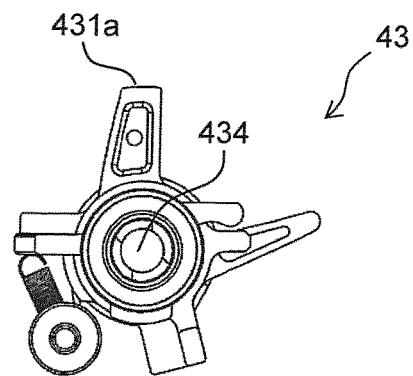
FIG. 6: a front view of the locking cam of the latch and release mechanism of FIG. 2.

The locking cam 43, shown in FIG. 6, is pivotally mounted in the housing 30 about a central pivot axis 434, and comprises at least one locking arm 431a.

Figure 7:
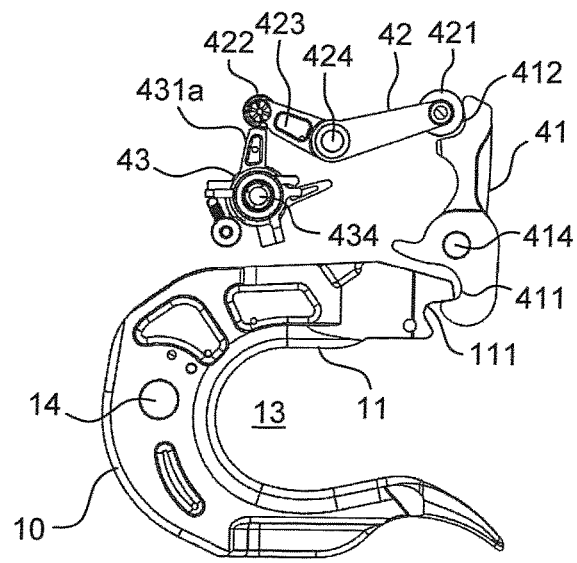
FIG. 7: a planar view of the latch and release mechanism and the hook of FIG. 2.

The latch and release mechanism, comprising the latch 41, the lever 42 and the cam 43, as well as the hook 10 in the closed position are shown in a planar view in FIG. 7 and in perspective view in FIG. 2.

The hook 10 is held in the closed position by means of its upper arm 11 which comprises a bolt 111 at its free end, said bolt being shaped so as to be housed in the lower cavity 411 of the lock 41 and rest on a bearing surface of said lower cavity. In the same closed configuration, the upper cavity 412 of the latch 41 supports the first roller 421 of the lever 42, said upper cavity having a bearing surface adapted to receive the first roller 421 and to the bearing thereof. At the other end of the lever 42, opposite the end comprising the first roller, the second roller 422 rests in stable equilibrium on the locking arm 431a of the locking cam 43. In the closed position, the stable equilibrium of the different elements is maintained by the locking of the locking cam 43 which is then immobilized in rotation about its central pivot axis 434.

The open position of the hook 10 is obtained by unlocking and rotating the locking cam 43, the latch and release mechanism ensuring a transmission of the movement to the hook 10 and producing the downward tilting thereof.

Figure 8:
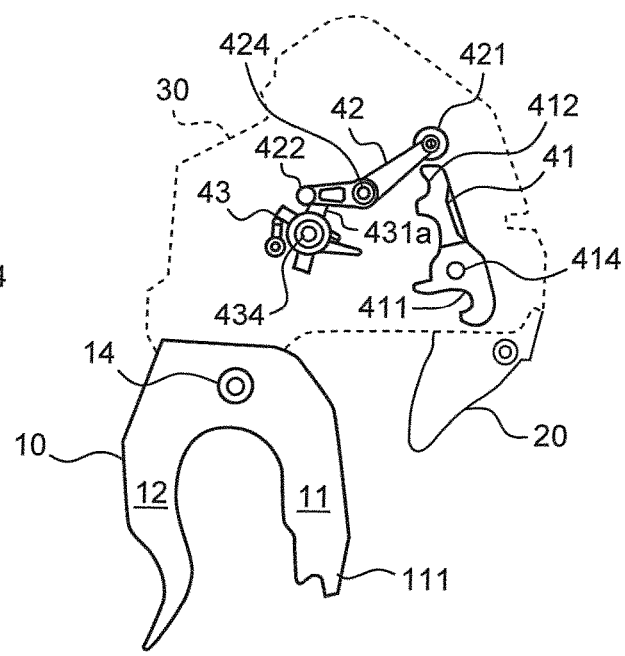
FIG. 8: a schematic and partial planar view of the bearing device revealing the latch and release mechanism and the hook in the open position.

The opening kinematics of the hook 10 from the rotation of the locking cam 43 corresponds, with reference to FIGS. 7 and 8, to a rotation in the clockwise direction of the locking cam which allows the locking arm 431a to drive the rolling of the second roller 422 of the lever 42 until said locking arm is removed in a recess 423 of said lever adjacent to the second roller. The insertion of the locking arm 431a into the recess 423 then releases the rotation of the lever 42 about the pivot axis 424 of the lever, said lever then pivoting in the anticlockwise direction by causing the first roller 421 to roll in the upper cavity 412 of the latch 41. The rolling of the first roller 421, directed upwards, continues until the first roller is released from the upper cavity 412 of the lock 41, the rolling is also maintained by the moment applied to the latch by the action of the hook 10 which tends to pivot the latch counterclockwise. When the lever 42 pivots completely to a predetermined stop, it completely releases the rotation of the latch 41 which then swings by the weight of the hook, and of the load supported thereby, until the bolt 111 of the hook 10 is released of the lower cavity 411 of the said latch, like a trigger system. The hook 10 is then free to tilt downwards by gravity and/or by elasticity.

FIG. 8 shows the latch and release mechanism and the hook in the open position.

Advantageously, the rollers of the lever 42 allow progressive transmission of the movement and of the forces, and thus limit, by virtue of the rolling, any sudden sliding movement of a component that could cause an impact of energy sufficient to damage the component in question and/or its mechanical connections.

According to one embodiment, the lever 42 can be weighted at its second roller or equipped with a spring in order to facilitate its pivoting when the locking cam 43 is rotated.

According to one embodiment, each axis of rotation of a roller of the lever 42 is fixed by means of suitable fastening means such as pins and nuts.

According to one embodiment, the rotation of the locking cam 43 is actuated and controlled by electrical and/or hydraulic controls.

In summary, the closing and opening of the hook 10 are controlled by the locking cam 43, and operated by means of the lever 42, the latch 41 and the load arm 11 having an equilibrium state in which said load arm supports a load and is locked, and an imbalance state in which the load arm releases the load and is unlocked.

The bearing device thus described can withstand a load of 5 kilograms to 10 tons without any risk of untimely opening in case of flight.

The latch and release mechanism coupled to the hook acts as a torque reducer and has an advantageous kinematics that allows the bearing device to support loads varying from five kilograms to ten tons with a locking cam of reduced dimensions that can be activated by reduced forces, and this minimizing the risk of untimely opening of the hook during the flight of the helicopter.

Figure 9:
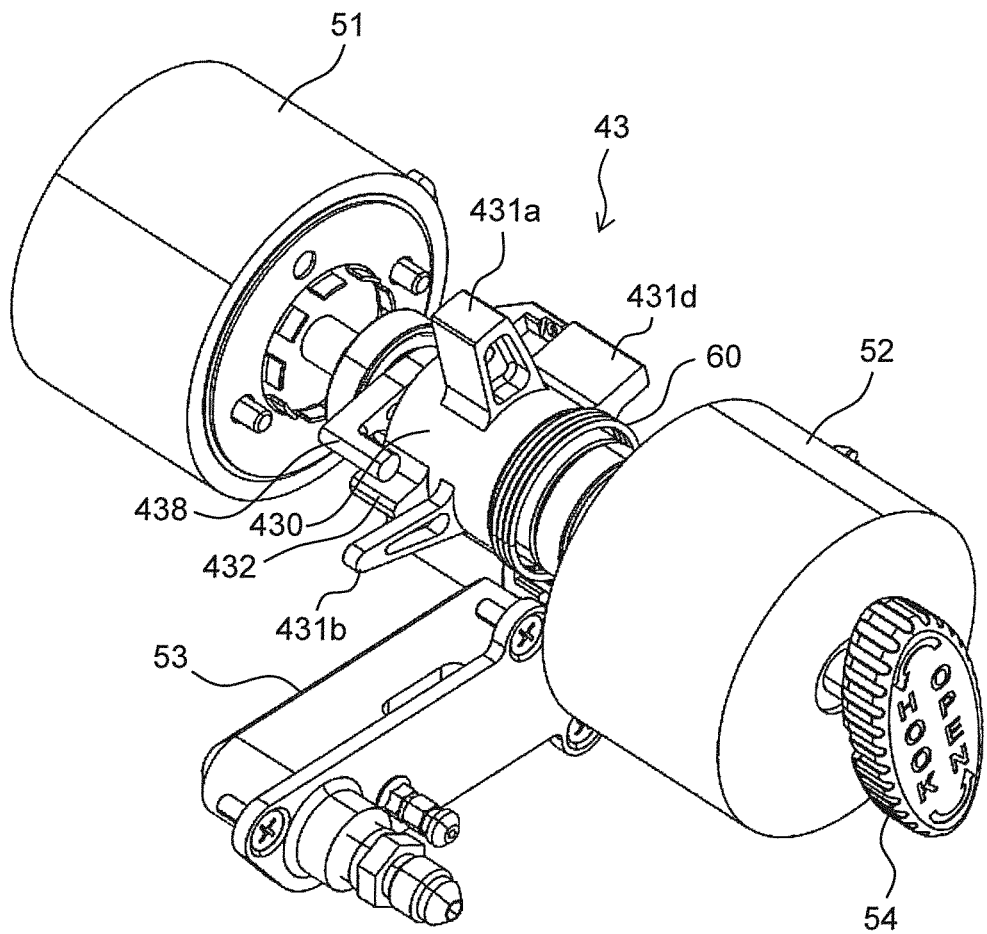
FIG. 9: a perspective view of the locking cam coupled to its activation means according to the invention.

According to the present invention, the locking cam 43 is actuated by four independent means for more secure release of the transported loads. The means for actuating the locking cam are illustrated in FIG. 9 which represents the locking cam 43 coupled to:
 a first electric control solenoid 51;
 a second electric control solenoid 52;
 a hydraulic control system 53;
 a mechanical unlocking lever 54.

The first solenoid 51 actuates the locking cam 43 during normal release and can also actuate said cam for emergency release, or safety release, the order of release being provided from the cockpit.

The second solenoid 52 is reserved for emergency release only and is controlled from the cabin by the onboard crew.

The presence of two solenoids for electrically controlling the locking cam 43 indeed makes it possible to dissociate the control of the normal release, provided by the first solenoid 51, of the control of the emergency release, ensured at least by the two solenoids 51 and 52.

The hydraulic control system 53 makes it possible to actuate the locking cam 43 for an emergency release, and can be activated from the cabin via an emergency handle that is not shown.

The mechanical unlocking lever 54 allows a ground crew to unlock the locking cam 43 to open the hook 10 of the hooking device for loading or unloading it.

Apart from the mechanical release lever 54, which can only be handled by a ground operator, the electric control solenoids 51 and 52 of the normal and/or emergency release as well as the hydraulic control system 53 of the emergency release enable the onboard crew to have a significant redundancy in the release commands, which improves the safety of helicopter load transport operations.

For example, the two electrical control solenoids 51 and 52 can be activated simultaneously for more reliability in critical situations such as precision release, and for more power each solenoid may be activated by an independent electrical circuit.

Figure 10:
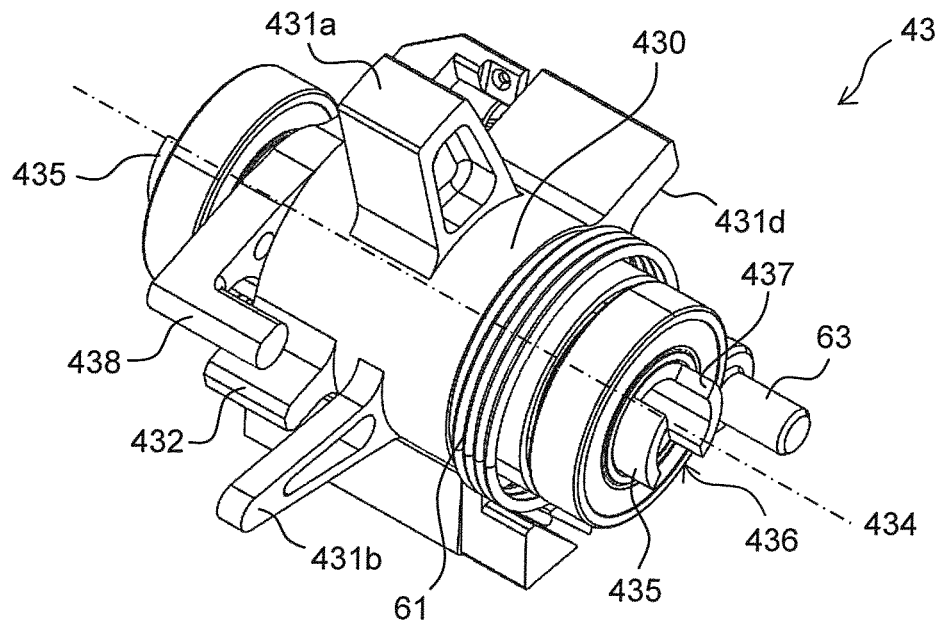
FIG. 10: a perspective view along a first side of the locking cam of FIG. 9.
Figure 11:
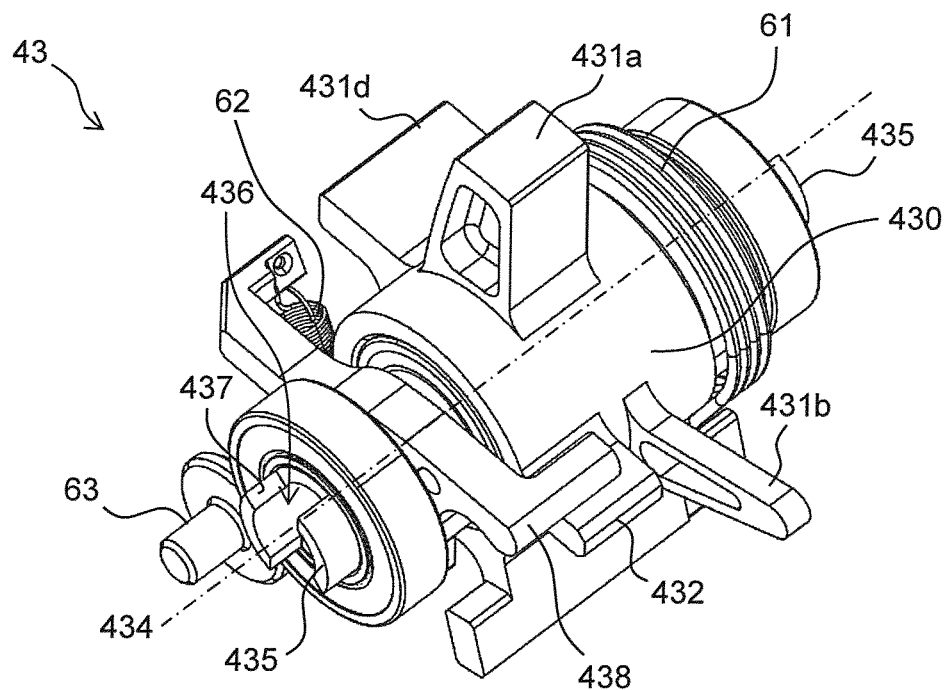
FIG. 11: a perspective view along a second side of the locking cam of FIG. 9.

The locking cam 43, according to the embodiment illustrated in FIGS. 10 and 11, comprises mainly a central hub 430 and a hollow cylindrical shaft 435 passing through the central hub and projecting it at its two ends. The hollow shaft 435 is coupled by each of its ends to a solenoid as shown in FIG. 9. Each solenoid induces a rotation of the shaft 435 which in turn drives the central hub 430 thus creating the pivoting movement of the locking cam 43 which is described in more detail below.

Figure 12A:
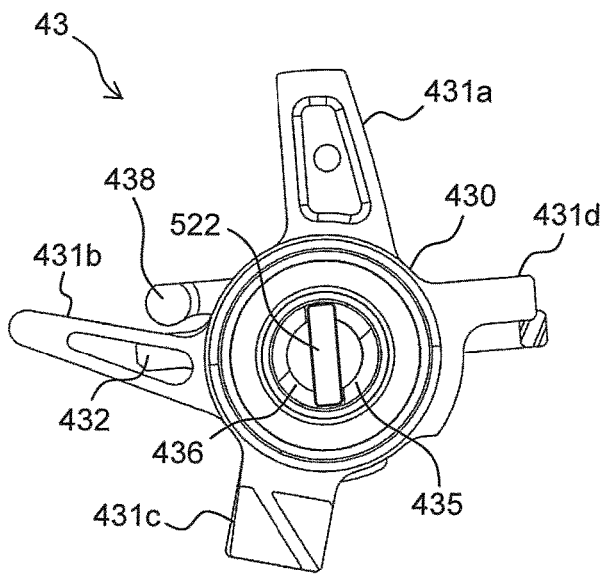
FIGS. 12a and 12b: planar views of the locking cam in a locked position (12a) and in an unlocked position (12b)
Figure 12B:
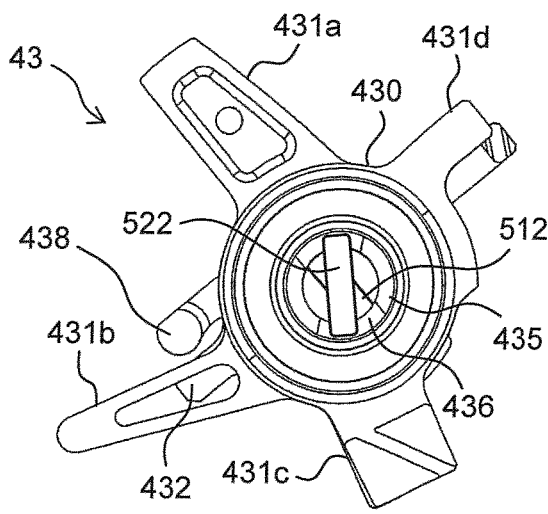

The central hub 430, according to the illustrated embodiment, has a cylindrical body with a circular cross-section, from which the body extends radially from the arms 431*a*, 431*b*, 431*c* and 431*d* in a configuration as shown in FIGS. 12*a* and 12*b*, the locking arm 431*a*, initially introduced, cooperating with the lever 42 of the latch and release mechanism described above.

The other arms have shapes suitable for performing secondary functions that are not fully explained.

Figure 14A:
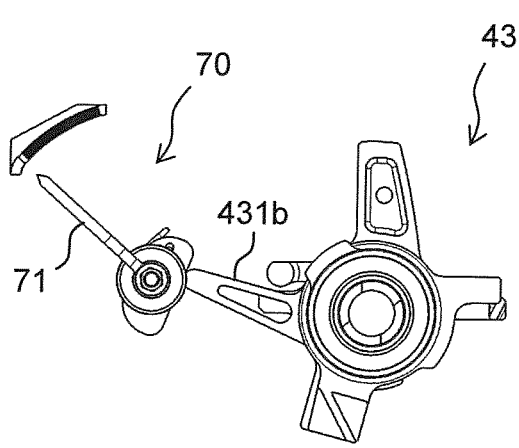
FIGS. 14a and 14b: planar views of the locking cam cooperating with an indicator device according to the invention.
Figure 14B:
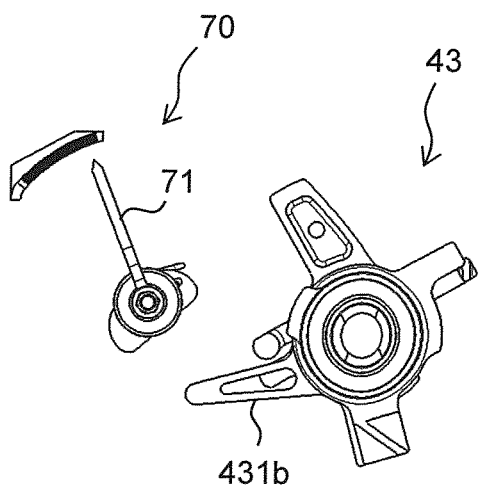

For example, the arm 431*b* may be connected to an indicator device 70 as shown in FIGS. 14*a* and 14*b* comprising a needle 71 which visually indicates the locking status of the locking cam, status directly related to the position thereof, through a window provided in a casing protecting said locking cam.

The central hub 430, according to the example illustrated, further comprises a protruding part 432 on which a transmission part 438 is supported, secured to the hollow shaft 435. The protruding part 432 therefore allows the shaft 435 to rotate, in the direction of the bearing of said transmission part on said protruding part, the central hub 430.

In the exemplary embodiment illustrated, the transmission part 438 is generally U-shaped with a base perpendicular to the shaft 435 and branches parallel to said shaft and offset relative thereto.

The hollow shaft 435, according to the exemplary embodiment illustrated, comprises at each of its ends two diametrically opposed notches 436 extending longitudinally over a determined length. The notches 436 of one end of the hollow shaft 435 are located opposite the notches 436 of the opposite end. Each notch 436 defines two radial walls 437 on the hollow shaft 435.

Each end of the hollow shaft 435 is coupled to an axis of a solenoid via a bar passing transversely through said pin and abutting against the radial walls 437 of the notches 436 of said end.

FIGS. 12*a* and 12*b* represent the first bar 512 of the first solenoid and the second bar 522 of the second solenoid inserted transversely into the notches 436 of the hollow shaft 435. Each bar has a length at least equal to the outside diameter of the shaft 435 and is placed diametrically between the two notches 436 of the end of the shaft to which it is coupled. The radial walls 437 of one and the same notch 436 have a gap allowing the bar placed in said notch to have a determined clearance.

Figure 13A:
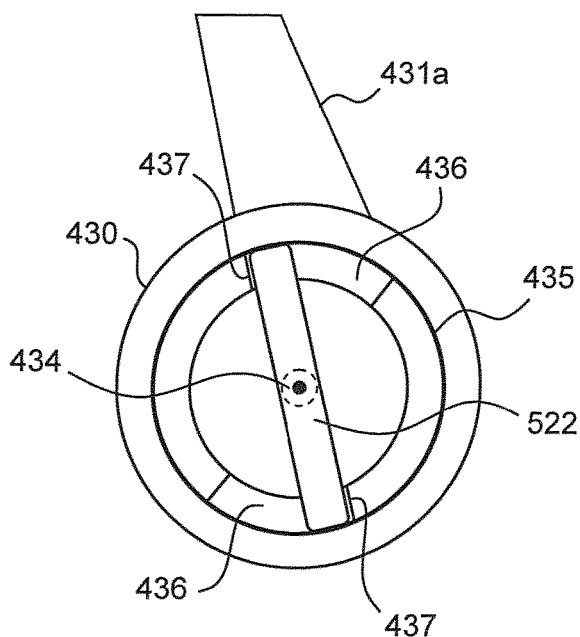
FIGS. 13a and 13b: schematic diagrams of FIGS. 12a and 12b respectively.
Figure 13B:
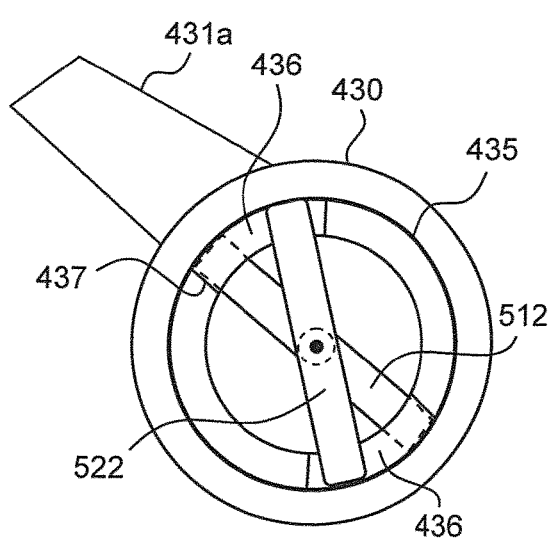

An example of operation of the locking cam is schematized in FIGS. 13*a* and 13*b*.

FIG. 13*a* represents the initial state of the locking cam, the second bar 522 and the first bar 512, hidden by said second bar, are each in contact with a first radial wall 437 of a first notch 436 and a second radial wall 437 of the diametrically opposite notch, the two notches 437 being substantially parallel.

When the first electric control solenoid is activated, the first bar 512 is rotated about the axis of the cam 434 in the anticlockwise direction, according to FIGS. 13*a* and 13*b*, under the effect of the electromotive force induced by the magnetic field of the first solenoid. The first rod then exerts a torque on the shaft 435 at the level of the radial contact walls 437 producing the rotation of said shaft and of the hub 430 which takes up by its protruding part 432 the movement of the transmission part 438 secured to the shaft 435 as shown in FIGS. 12*a* and 12*b*.

According to the invention, the two solenoids 51 and 52 are decoupled and can be activated separately or simultaneously. The examples of FIGS. 12*a* to 13*b* illustrate an activation of the first solenoid alone, the second bar 522 therefore remains in its initial position, the rotation of the shaft 435 under the effect of the first bar 512 not affecting the second bar 522 due to the spacing between the radial walls 437 of the notches 436.

Advantageously, this redundancy allows the crew to have two independent activation means, dividing by two the probability of total failure of the activation.

In addition, the torque required to rotate the cam can also be divided by two by simultaneously activating the two solenoids.

In the embodiment illustrated in FIG. 11, the transmission part 432 is connected to a rod 63, secured to the housing of the bearing device, not shown in this figure, by a tension spring 62 that dampens the movement of said transmission part and therefore of the shaft 435, and returns said shaft to its initial position when the action of the solenoids ceases.

The central hub 430 is returned to its initial position, which corresponds to the locking position of the locking cam 43, by means of a torsion spring 61 connecting said central hub to the rod 63 secured to the housing of the coupling device.

The invention claimed is:

1. Bearing device for lifting and transporting loads comprises a hook, a housing in which the hook is pivotally mounted, and a latch and release mechanism placed inside the housing and allowing to lock the hook in a closed position and to release said hook into an open position, the latch and release mechanism comprising a pivot latch provided with a lower cavity shaped to receive an upper end of the hook, a lever cooperating with the latch and a locking cam for actuating the lever, characterised in that the lever is pivotally mounted in the housing and comprises a first roller at a first end and a second roller at a second end opposite the first end, in that the latch comprises an upper cavity in which the first roller can rest and roll, in that the locking cam is provided with at least one locking arm on which the second roller can rest and run, and in that rotation of the locking cam in one direction produces a tilting of the lever in the other direction, releasing the first roller from the latch, and pivoting the latch under the effect of the hook until the end of said hook is released of the lower cavity of said latch.

2. Bearing device according to claim 1, wherein the hook is mounted so as to pivot about a pivot axis of the hook and comprises an upper arm, ending in the upper end, and a lower arm, said arms defining a groove capable of receiving a connector of a lifting accessory.

3. Bearing device according to claim 2, wherein a safety pawl is mounted so as to pivot about a pivot axis of the pawl between an open position allowing the engagement of a pawl connector of the lifting accessory in the groove of the hook and a closed position closing an opening of said groove.

4. Bearing device according to claim 3, wherein the closed position of the pawl has an unlocked state allowing the passage of the pawl to the open position by a pressure of the connector of the lifting accessory, and a locked state in which the pawl is immobilized.

5. Bearing device according to claim 1, in which the latch is pivotally mounted in the housing about a pivot axis of the latch, and in which the lower cavity has a bearing surface on which the upper end of the hook rests in the closed position and the upper cavity has a rounded concave surface which conforms to a shape of the first roller.

6. Bearing device according to claim 1, in which the lever is pivotally mounted in the housing about a pivot axis of the lever and comprises a recess between said pivoting axis of the lever and the second roller.

7. Bearing device according to claim 6, wherein the rotation of the locking cam for opening the hook produces the insertion of the locking arm into the recess of the lever.

8. Bearing device according to claim 1, in which the tilting of the lever is achieved by the action of the locking arm on the second roller when the locking cam is rotated and by the action of the upper cavity of the latch on the first roller under the effect of the weight of the hook.

9. Bearing device according to claim 1, in which the rotation of the locking cam is configured to be actuated and controlled by at least one electrical control.

10. Bearing device according to claim 1, in which the rotation of the locking cam is configured to be actuated and controlled by at least one hydraulic control.

* * * * *